E. J. LEES.
MACHINE FOR MANUFACTURING TWIST DRILLS AND OTHER ARTICLES.
APPLICATION FILED APR. 11, 1914.

1,254,816.

Patented Jan. 29, 1918.
15 SHEETS—SHEET 1.

WITNESSES:
Walter F. Gage.
Geo. B. Pitts

INVENTOR
ERNEST J. LEES.
BY
Kerr, Page, Cooper & Hayward
ATTORNEY

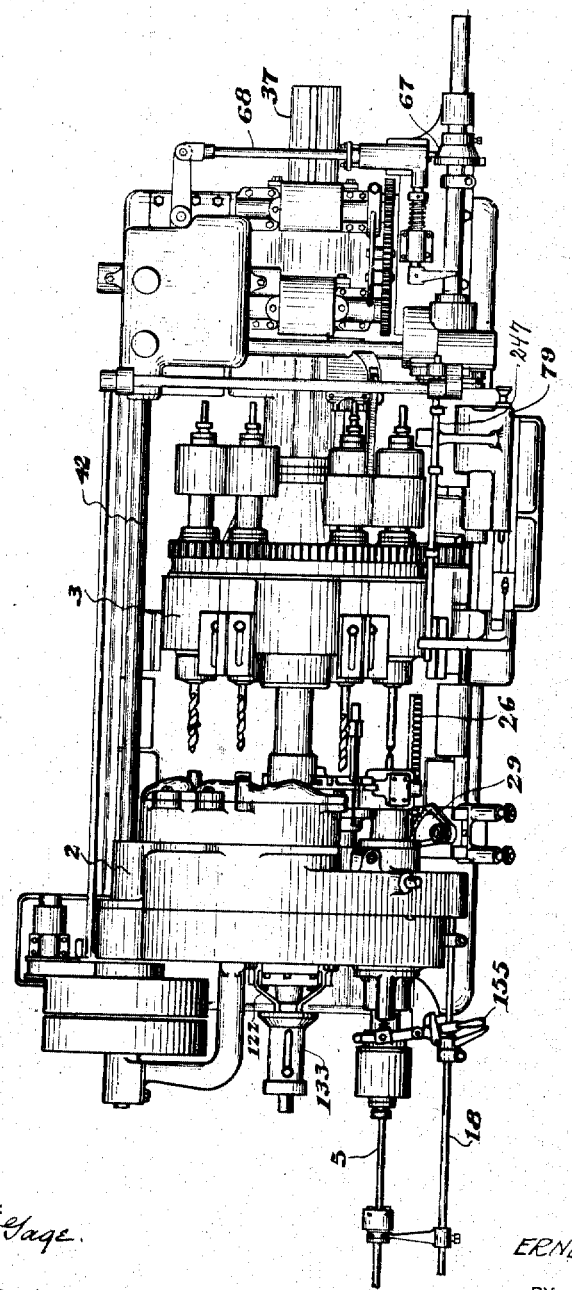

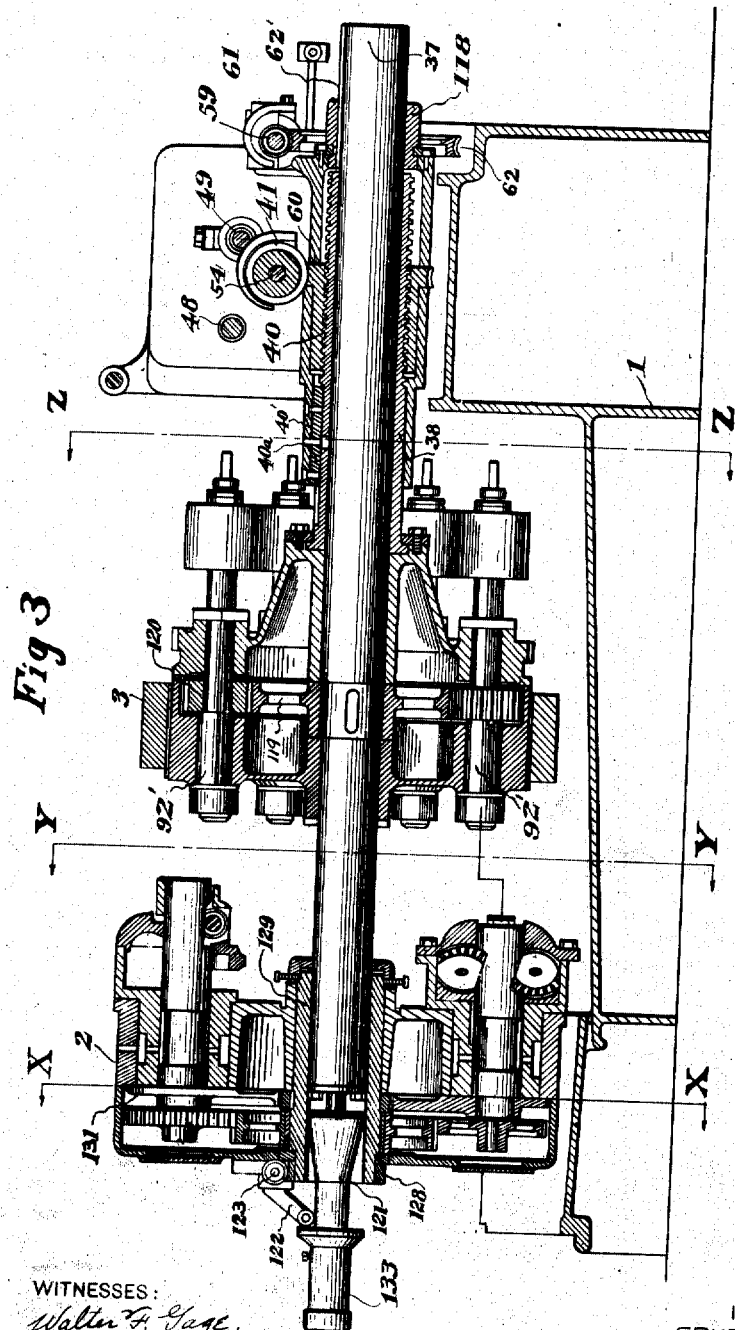

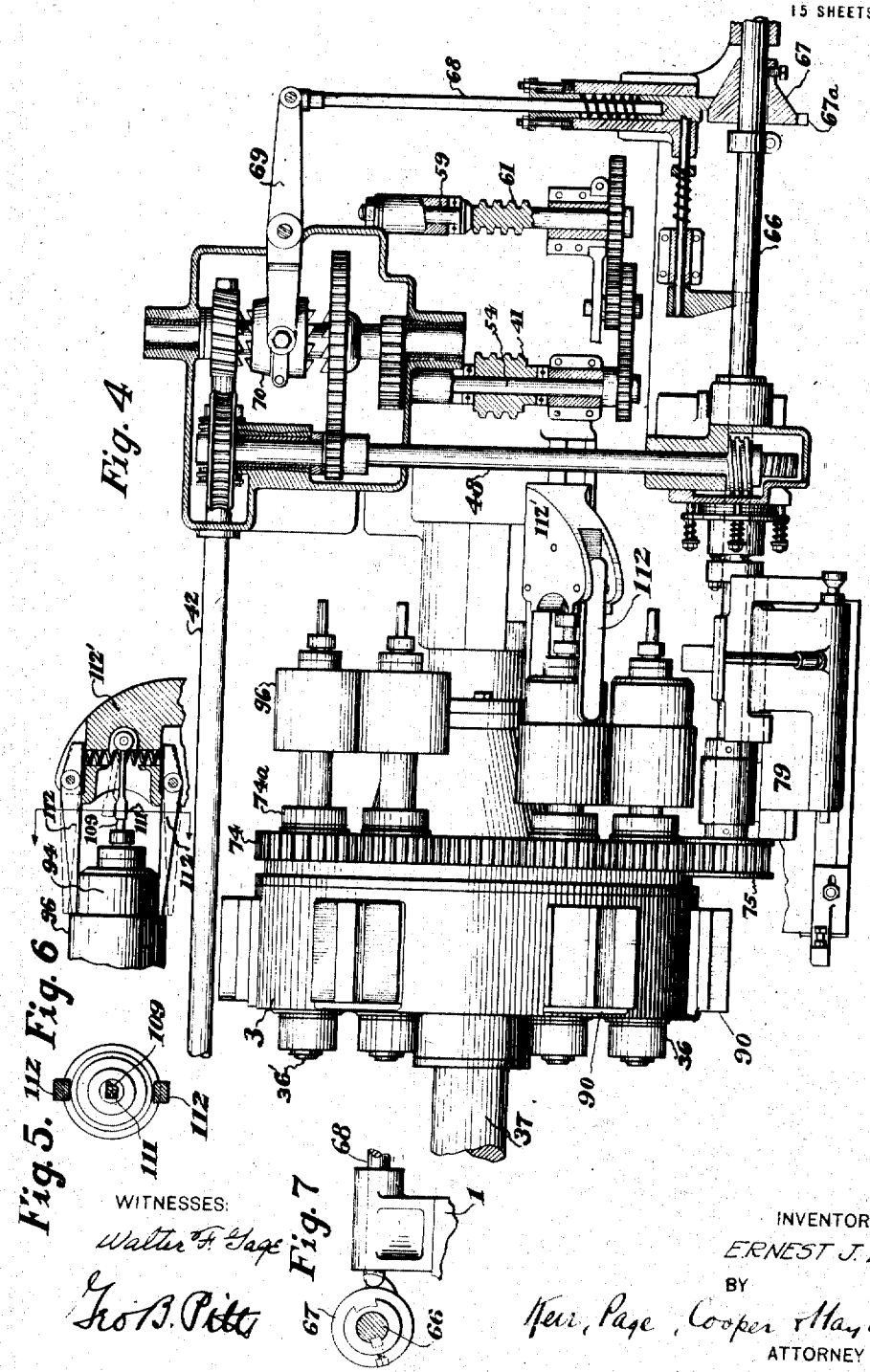

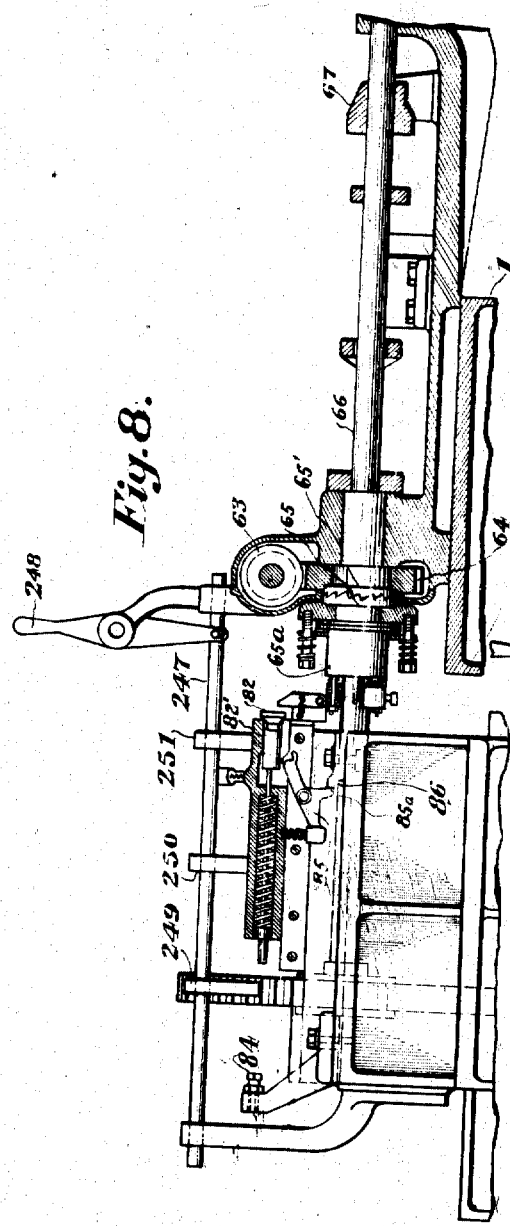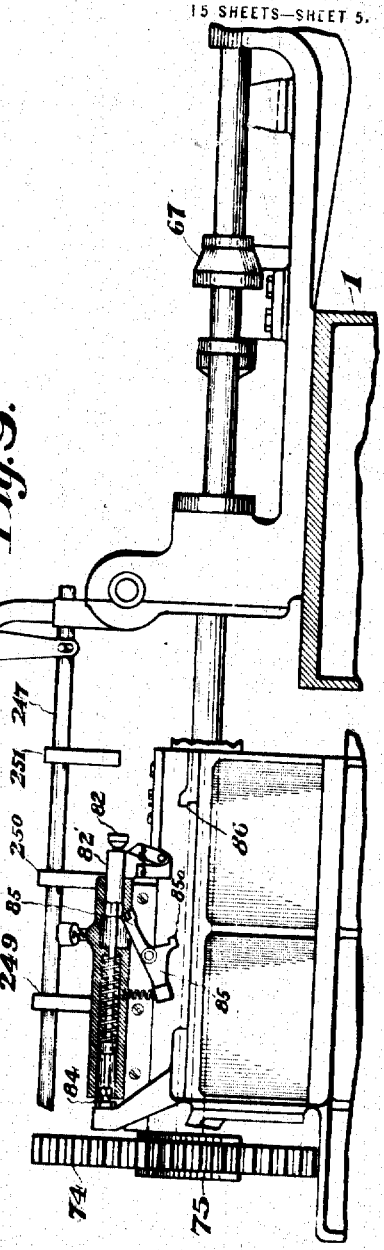

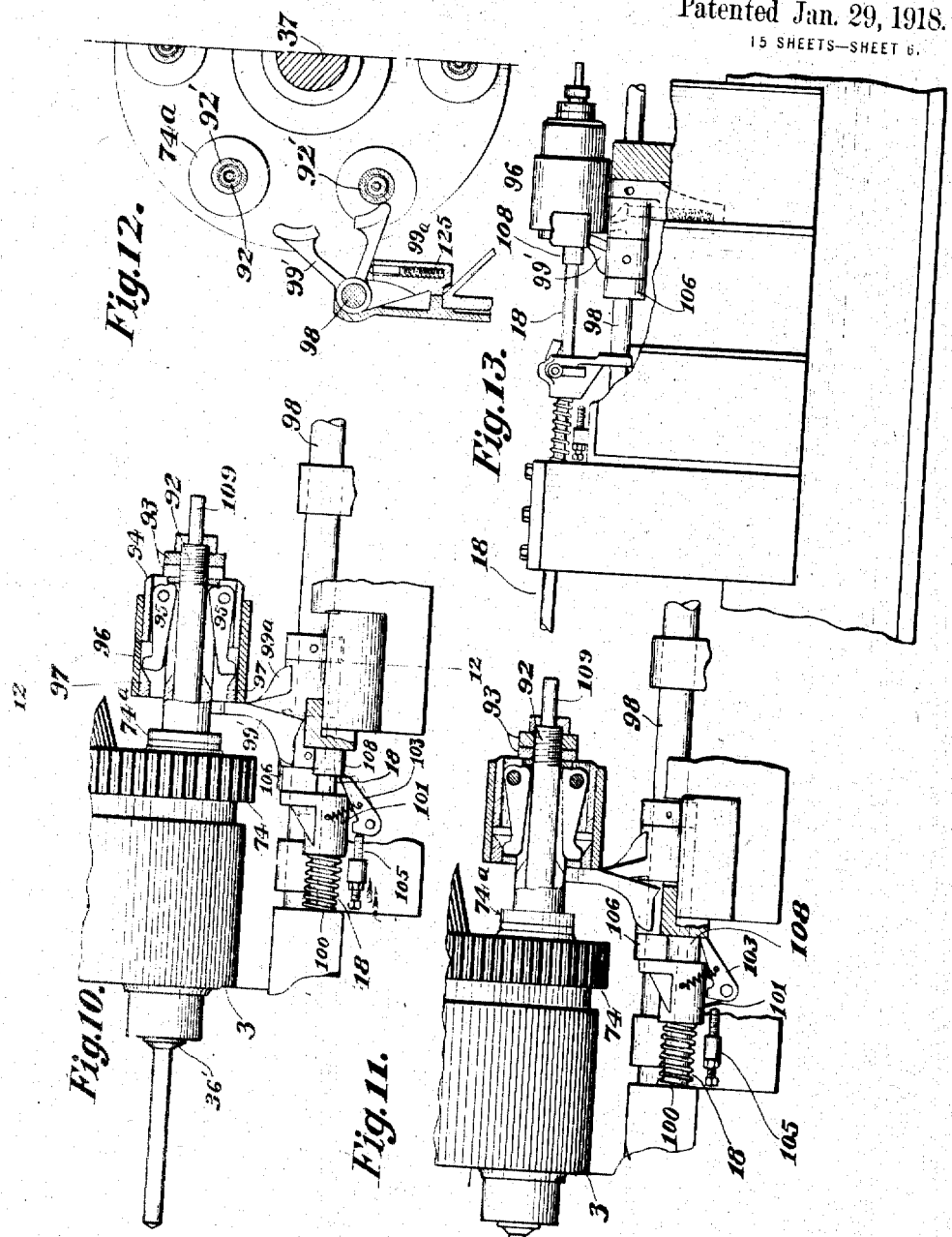

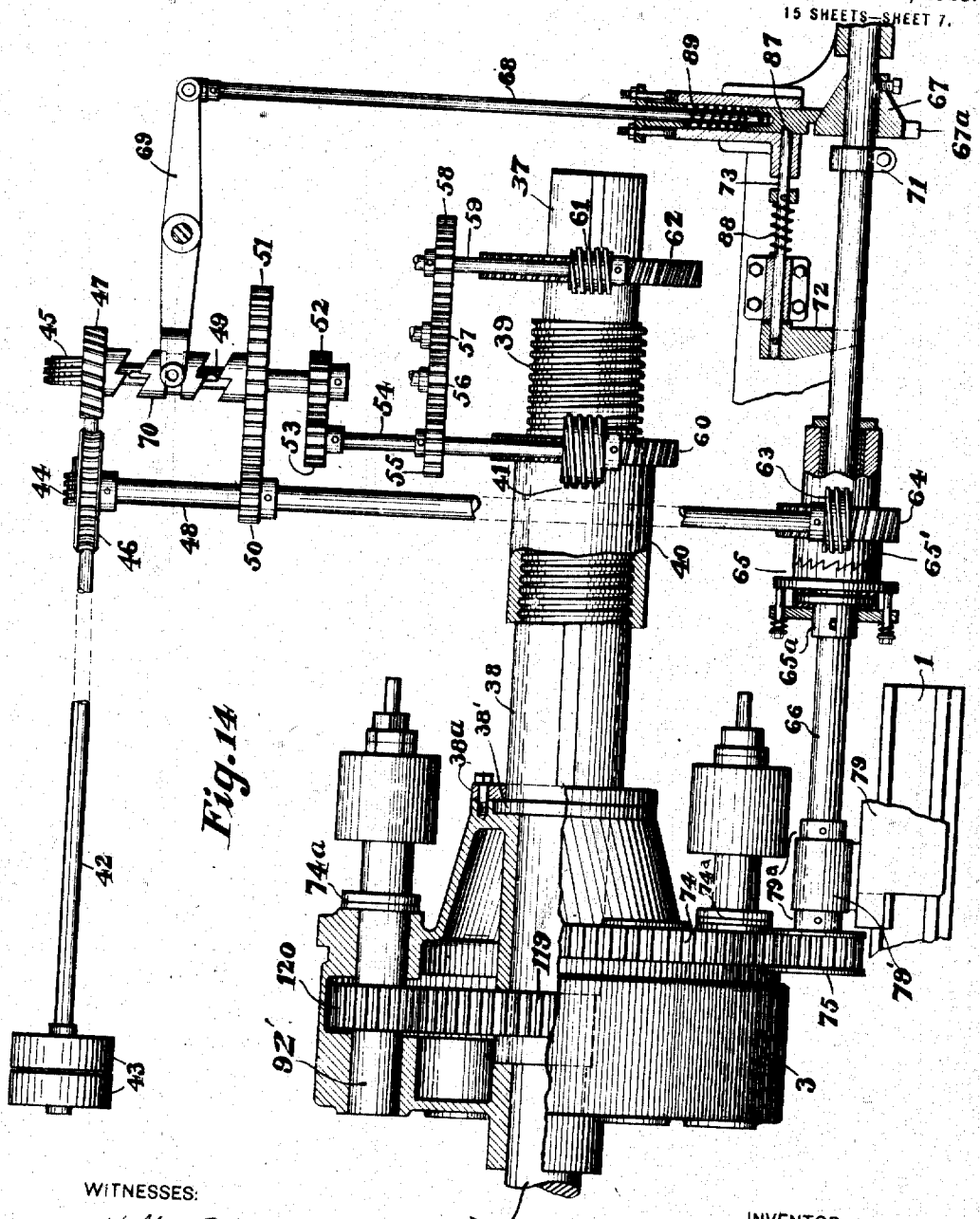

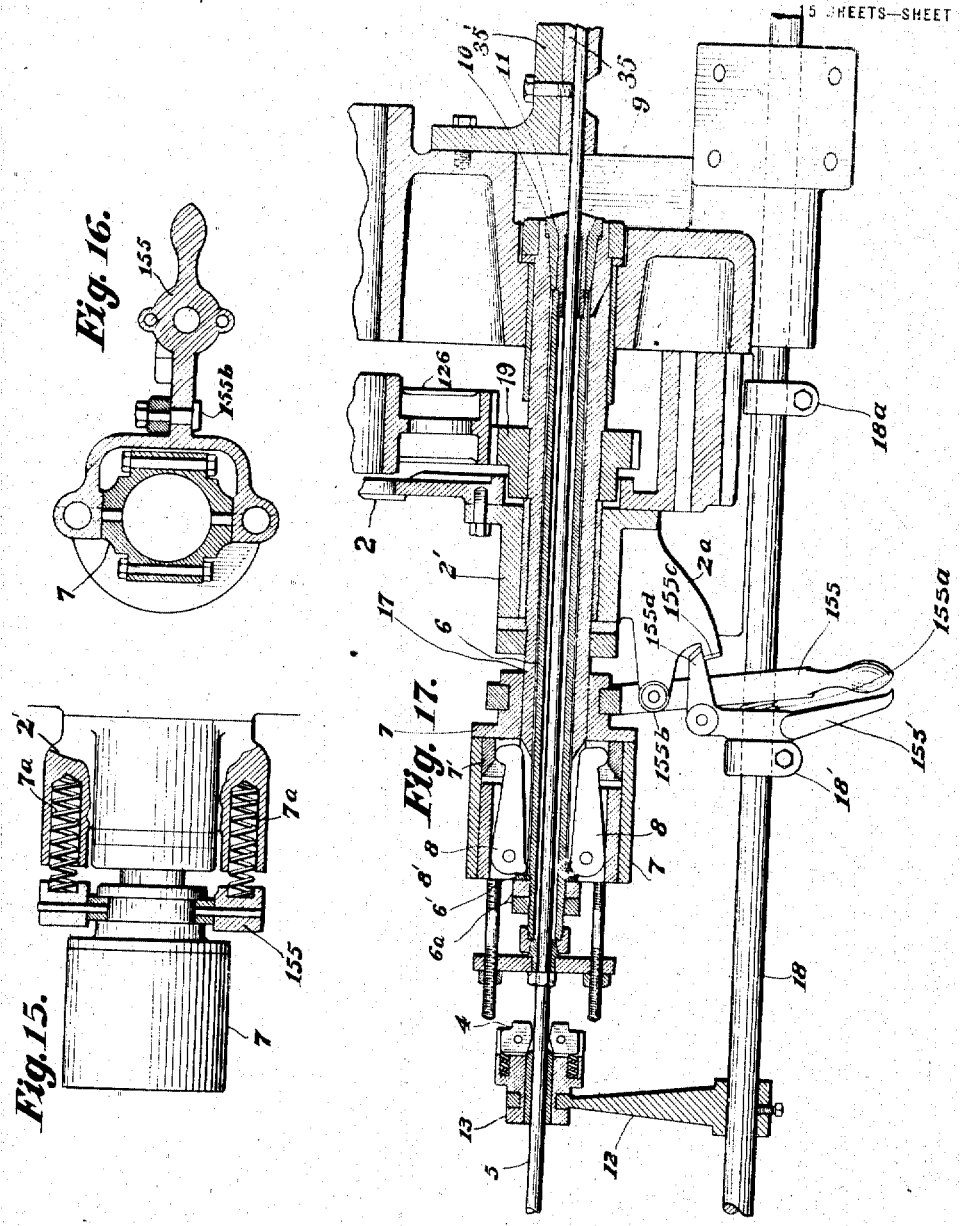

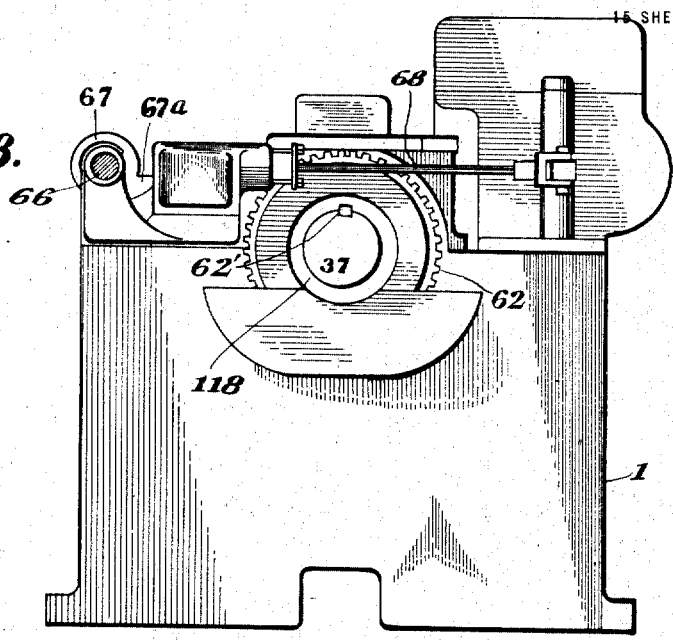
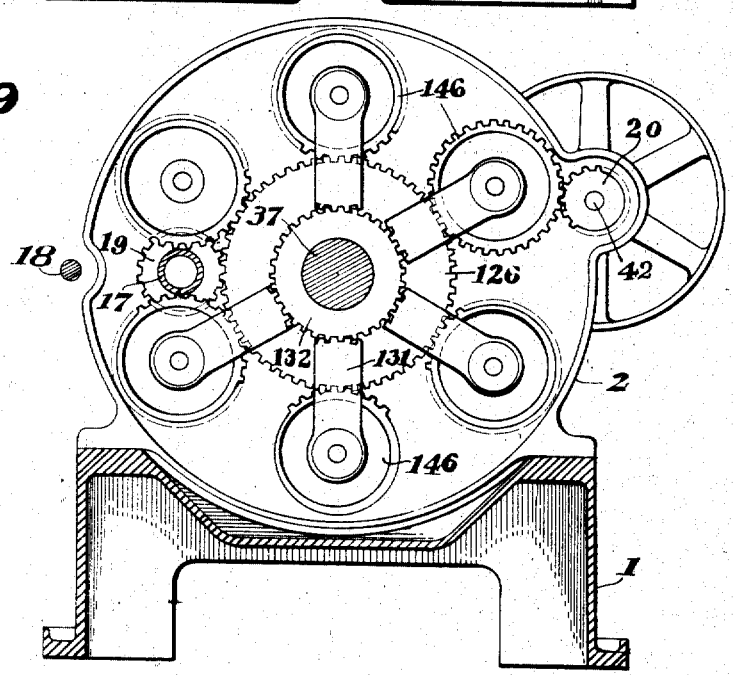

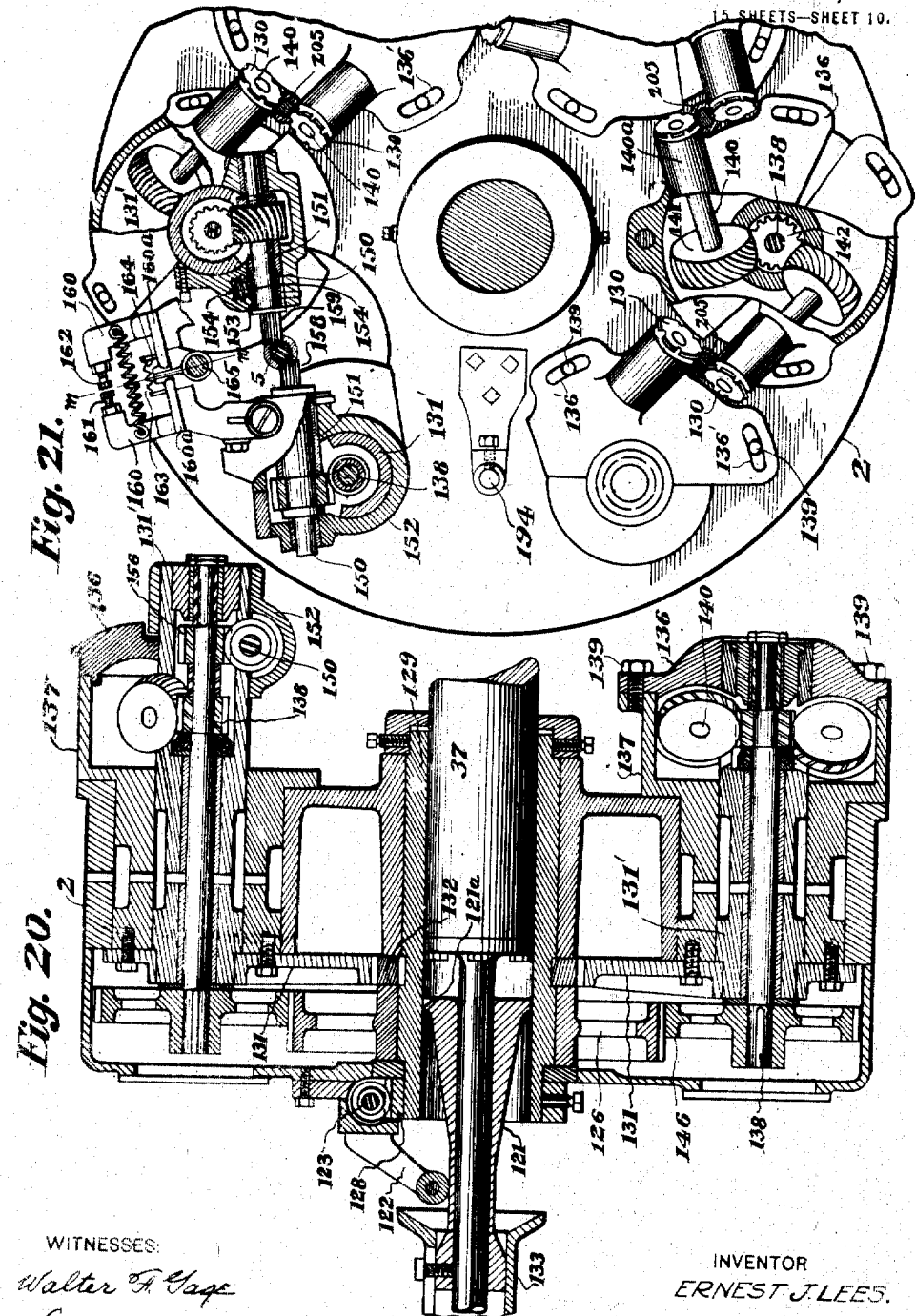

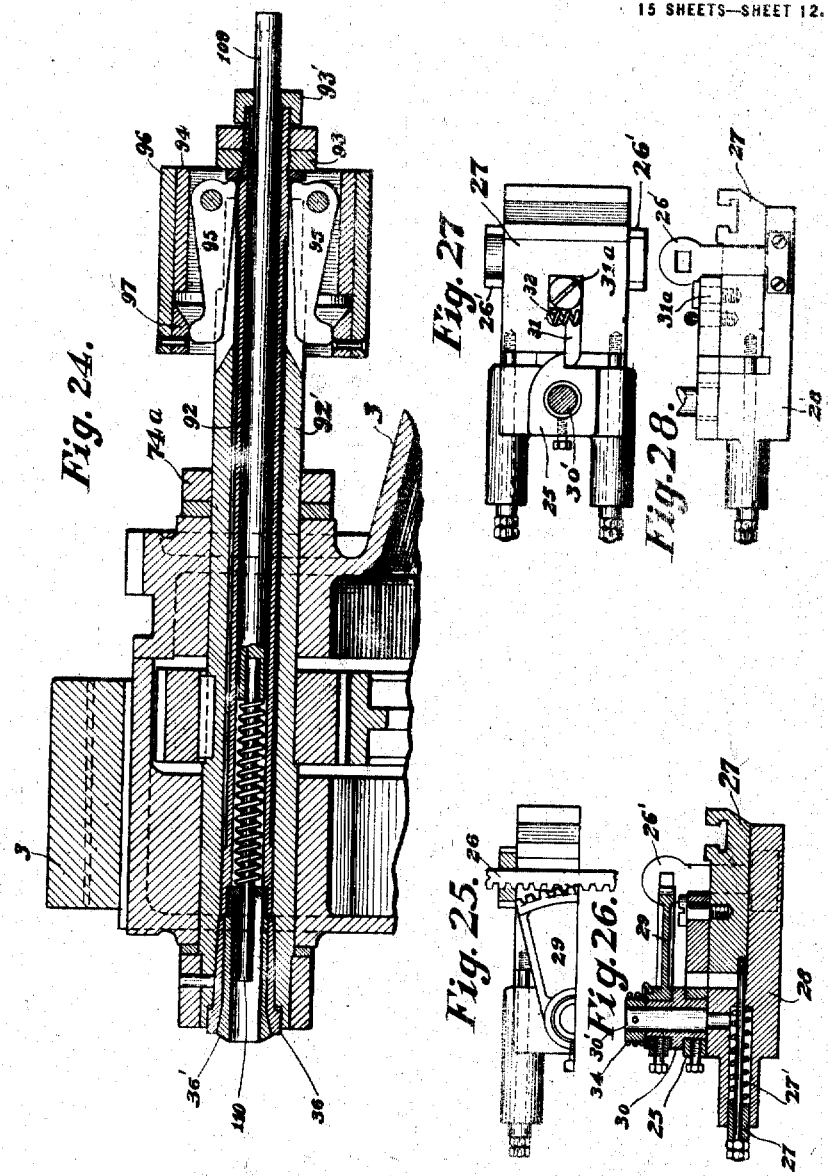

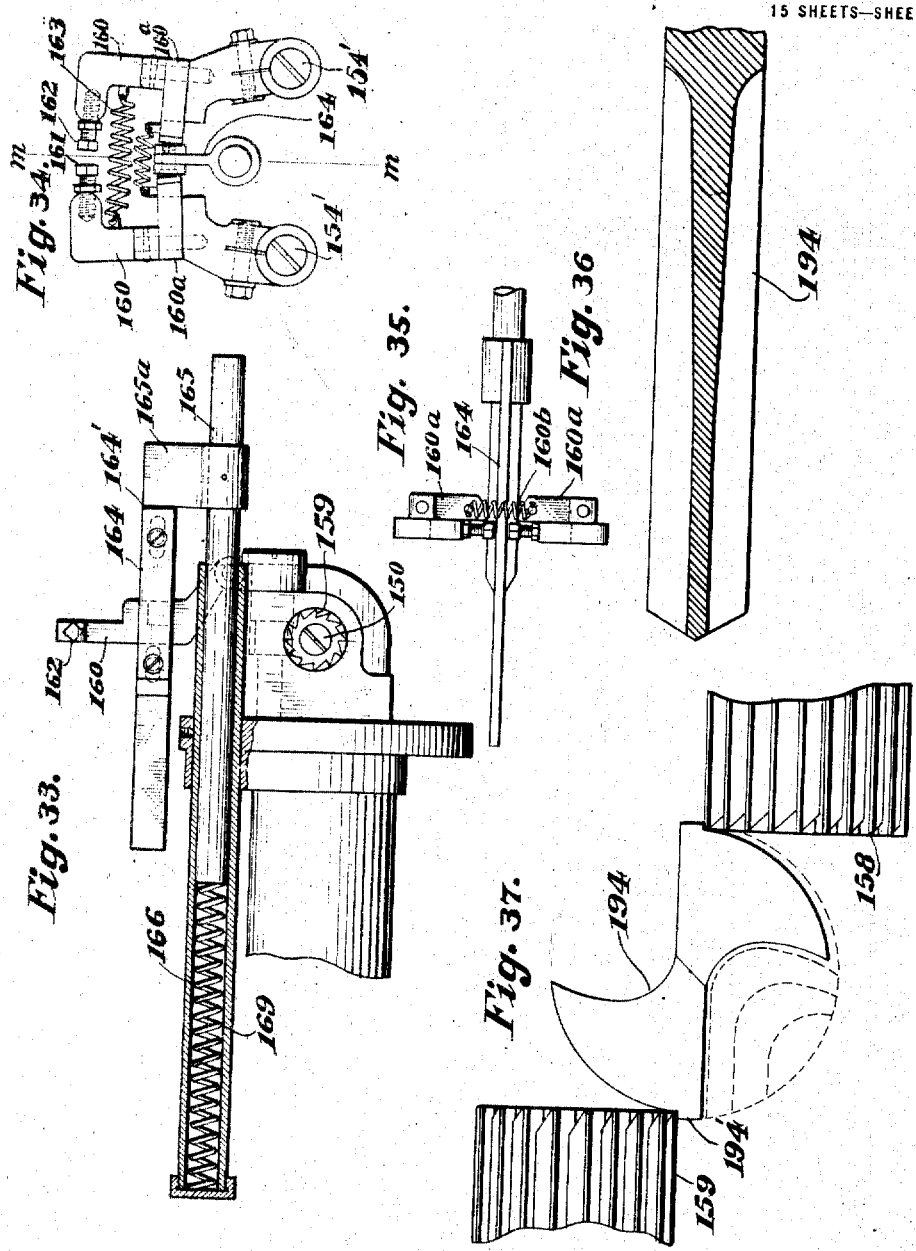

E. J. LEES.
MACHINE FOR MANUFACTURING TWIST DRILLS AND OTHER ARTICLES.
APPLICATION FILED APR. 11, 1914.
1,254,816.
Patented Jan. 29, 1918.
15 SHEETS—SHEET 15.
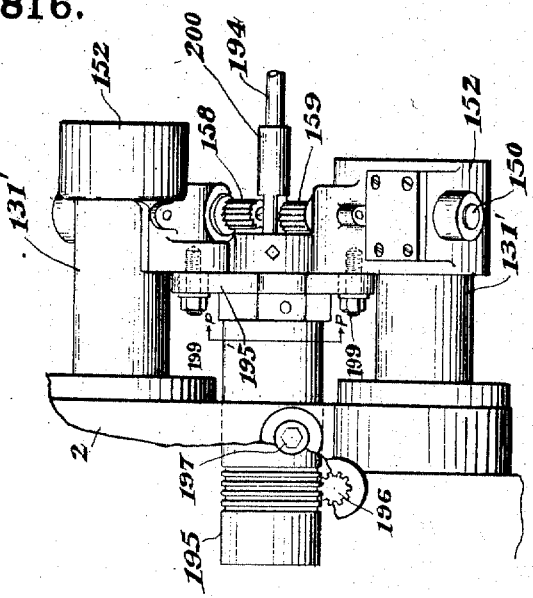
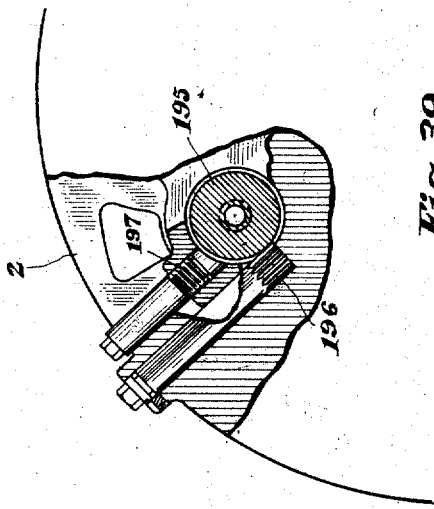
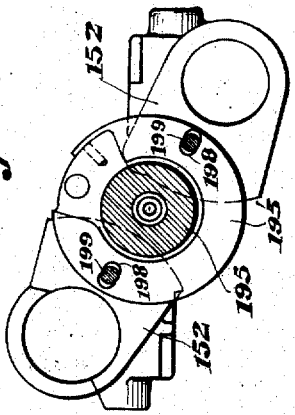
WITNESSES:
Walter F. Gage.
Geo. B. Pitt.
INVENTOR
ERNEST J. LEES.
BY
Kerr, Page, Cooper & Hayward
ATTORNEY

UNITED STATES PATENT OFFICE.

ERNEST J. LEES, OF CLEVELAND, OHIO, ASSIGNOR TO A. D. WILT, JR., OF DETROIT, MICHIGAN.

MACHINE FOR MANUFACTURING TWIST-DRILLS AND OTHER ARTICLES.

1,254,816.  Specification of Letters Patent.   Patented Jan. 29, 1918.

Application filed April 11, 1914.   Serial No. 831,122.

*To all whom it may concern:*

Be it known that I, ERNEST J. LEES, a citizen of the United States, residing at Cleveland, in the county of Cuyahoga and State of Ohio, have invented certain new and useful Improvements in and Relating to Machines for Manufacturing Twist-Drills and other Articles, of which the following is a specification.

This invention consists in an automatic machine which is primarily designed for the manufacture from blanks or from a bar of raw stock of twist drills, and which although capable of making reamers, taps and many other like articles, is herein described mainly as an apparatus for the specific purpose of making twist drills.

The invention involves improvements in the construction and operation of a machine of this character which is made the subject of, and illustrated in, a patent granted to Abram D. Wilt, Jr., on December 6, 1910, No. 978,097.

In the said patented machine the several operations of cutting the stock and fashioning and finishing the drills are performed successively, there being a plurality of work stations at which the work in its different stages is performed simultaneously. In other words, there is provided a tool holder or head having a plurality of tools, and a blank carrier or turret for holding the severed sections of stock, associated with the same, and provided with chucks or devices for holding the blanks in position to be operated on at the tool stations. The blanks, after being turned and severed from the stock, are received and held by the chucks and by the rotation of the blank carrier are carried from station to station where the work upon them is performed.

In this way, as all the chucks of the blank carrier are provided with blanks, a different stage in the work is being simultaneously carried on at each tool station, and then, by the rotation of the blank carrier the blanks are advanced to the next tool station for the next succeeding operation, or expelled from the machine, as the case may be.

The machine in question, moreover, differs from others in the prior art by the fact that there is a correlation between the work performed at one station and that performed at the next succeeding station. That is, in the making of such articles as twist drills, reamers and the like, if the operation involves the dressing or shaping of the blank and the cutting of the same from the bar of stock, and the second operation involves the milling of the grooves, the latter operation will be one requiring a considerable length of time as compared with the former. But to correlate the two, the milling of the grooves is divided up into a plurality of stages or operations, the first milling being a comparatively shallow cut at one station, followed by successively deeper cuts at the succeeding stations until the proper depth of cut is secured.

A machine so organized as to divide up the work in stages is capable of turning out a great many drills in a short space of time, but it is essential that the arrangement be such that there is maintained between the work performed at the successive stations a certain definite relation. That is, if the milling cutters at one station are designed to cut the grooves to a predetermined depth, and then the work is to be carried on to the next station where the grooves are to be cut slightly deeper, it is essential that the tools at such succeeding station will traverse in the same time precisely the same path, and so on for the succeeding stations where the work is performed upon the same path.

The general object of the machine, therefore, is to cut blanks from a continuous bar of stock and perform the various cuts and operations thereon at succeeding tool stations, and finally eject from the machine the finished product, and the invention, subject of this application, consists in improvements on said machine, the nature and purpose of which will be described in detail by reference to the accompanying drawings.

The objects of my invention may be accomplished by the use of the apparatus illustrated in these drawings as the best embodiment of the same of which I am now aware.

Fig. 2 is a top plan view of the same.

Fig. 3 is a sectional elevation of the principal part of Fig. 1.

Fig. 4 is an enlarged plan view of the blank carrier and a sectional plan of some of the connected parts.

Fig. 5 is a section on the line 5—5, Fig. 6.

Fig. 6 is a view partly in side elevation and partly in section of the same of a portion of the mechanism for operation of the chucks for the blanks.

Fig. 7 is a detail on an enlarged scale of a means for shifting the forward and reverse gears.

Fig. 8 is an enlarged detail, in sectional elevation, of the means for releasing, rotating, and indexing the blank carrier.

Fig. 9 is a similar view of the same parts, with the blank carrier rotating shaft in a different position.

Figs. 10, 11, 12 and 13 are views partly in elevation and partly in section illustrating the chucking or gripping mechanism for the blanks.

Fig. 14 is an enlarged illustrative diagram of the apparatus drawn to exhibit the relation of certain of the parts rather than their specific construction.

Figs. 15, 16 and 17 are views partly in elevation and partly in section of the devices for gripping and feeding the stock.

Fig. 18 is an end view of the machine looking from the right in Fig. 1.

Fig. 19 is a sectional view on the line X X of Fig. 3.

Fig. 20 is a central longitudinal section of the tool holder or head.

Fig. 21 is a section on the line Y Y of Fig. 3, parts being broken away, and others shown in section for the purpose of more clearly illustrating them.

Fig. 24 is a sectional detail of a portion of the blank carrier.

Figs. 25, 26, 27 and 28 are devices for holding and operating the blank cutting tool.

Fig. 33 is a section on the line $m$—$m$, Fig. 34.

Fig. 34 is an end elevation of a portion of some of the parts shown in Fig. 33.

Fig. 35 is a plan view of the parts shown in Fig. 34.

Fig. 36 is a section through a drill illustrating the varying depth of cut of the grooves.

Fig. 37 is an end view of a drill blank, the dotted lines illustrating successive cuts, and the positions of the clearance cutters being shown.

Fig. 38 is a view illustrating a part of the adjusting mechanism for the clearance cutters.

Fig. 39 is a section on the line $p$—$p_1$, Fig. 40.

Fig. 40 is a plan view illustrating the mounting of the clearance cutters.

Fig. 41 shows inside elevation and end view in drill blank as cut.

Figure 1:
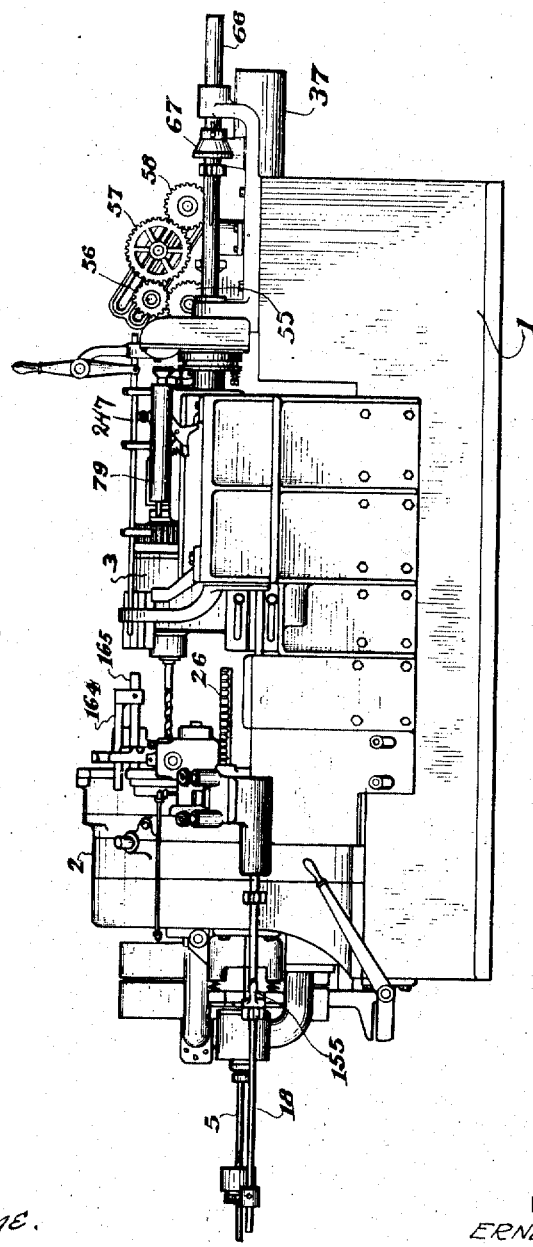
Figure 1 is a side elevation of the complete machine.

The machine in general comprises a frame 1 upon which are mounted a stationary tool holder or head 2, a reciprocating and rotatable blank carrier or turret 3, and the other parts designed to move the latter to and fro with respect to the tools, to rotate the same by successive steps, to feed the blanks and to perform the other functions incident to the operation of the machine.

As a matter of convenience in illustrating, the construction of the device will be described in the order of the operations performed, as far as possible, beginning with the introduction of the blanks.

In the forward part of the machine are pivoted dogs 4, Fig. 17, suitably supported so as to engage the stock 5 between them and direct it in the line of feed. The tube 6, which operates the chuck or collet 9, by which the stock is clamped and held during the return movement of the dogs 4, surrounds the stock within the tube 17.

The chuck or collet 9 is actuated by a sliding collar 7 on the tube 17 through the medium of the bell crank levers 8 pivotally mounted in the shell 8', suitably secured to the tube 6, and an arm 155 at one end bifurcated to engage the collar 7, which slides between fixed adjustable stops 18' and 18ᵃ on the reciprocating bar 18. The levers 8 are actuated by cams 7' on the collar 7, and operate to shift the tube 6 longitudinally in relation to the nose 10, the latter being provided with a tapering shoulder 11, engaging the collet 9 and clamping the same against the stock bar. In this connection, the ends of the bell crank levers 8 engage a washer 6' positioned on the tube 6 by means of the nuts 6³. The stock gripping dogs 4 are suitably mounted upon an arm 12 having a bifurcated end engaging a collar 13. The position of arm 12 is adjustable along the bar 18 with which it is adapted to move to and fro. 155' is a bell crank lever pivotally mounted on the lever 155. 155ˣ is a spring interposed between these levers. The lever 155 is pivoted at 155ᵇ to a support or bracket 2ˣ fastened to the head 2'. This bracket carries a projection 155ᶜ with which the end 155ᵈ of the lever 155' is adapted to engage to hold the lever 155' and the clutch mechanism connected therewith in position to release the bell crank levers 8 from the tube 6.

Springs 7ᵃ interposed between the bifurcated end of the lever 155 and the outer bearing piece 2' normally tend to press the cams 7 so as to close the gripping levers 8 which lock the stock bar 5 in collet 9.

These parts are substantially the same as in the prior patent above referred to.

As the means for operating the arm 12 and the controlling device 155 for the stock gripping mechanism, I employ the rod 18 connected and mounted to reciprocate with the movable blank carrier 3. In this way a direct pull on the dogs 4 is secured and proper length of feed of the stock is accomplished.

When the stock by the above described or other suitable means has been properly advanced and gripped by the chuck or collet 9, it is rotated by the gears 19, 126 and 146, Fig. 19, arranged in the stationary head 2 and engaged with the gear 20 on the main driving shaft 42 of the machine.

Figure 23:
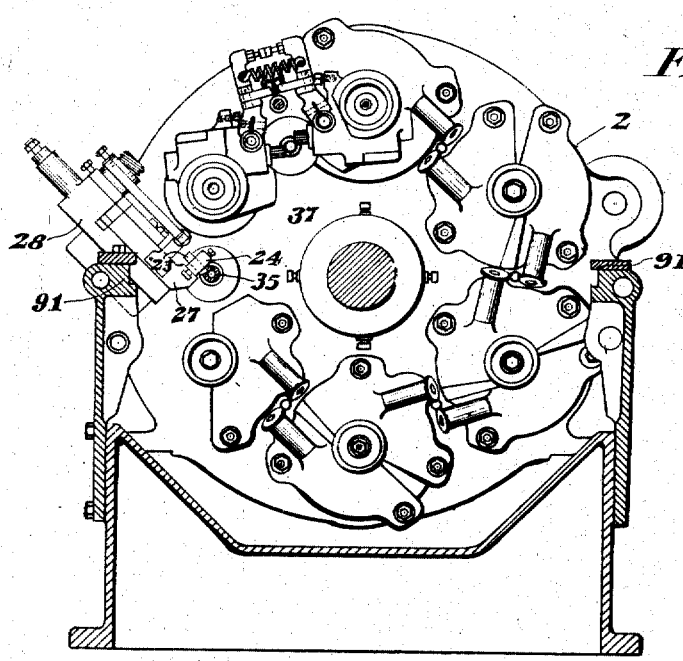
Fig. 23 is a section through the shaft showing in elevation the tool holders.

At a short distance from the end of the spindle nose 10, Fig. 23, is a cutting tool 23 mounted on a tool post 24 secured to slide 27 and adapted to be pushed into cutting engagement with stock bar 5. 26 is a rack, Fig 25, mounted in guide brackets 26' carried by a suitable support or guide 28, secured to the head 2.

This rack is moved forward by engagement of its rear end with the blank carrier 3. The rack in turn engages segment 29, secured to sleeve 30, which is pivotally mounted on stud 30' having secured thereto a cam 25. This cam bears against arm 31, Fig. 27, pivotally mounted at 31ˣ on the slide 27 to effect the inward feed of the tool 23, and to sever the stock bar 5 thereby. On the return of the blank carrier, the cam 25 resumes its normal position by the action of the coiled spring 54, and rack 26, Fig. 26, the segment 29 being returned to its rearward position at the same time. The free end of arm 31, Fig. 27, is swung about by the nose of the cam 25, until the latter clears the arm 31, which is then returned to its normal position by the spring 32. The slide 27 is retracted through the instrumentality of the springs 27' surrounding rods 27 and each interposed between a nut at the other end of one of said rods and an abutment on the guide 28.

In practice, a suitably supported guide tube or pilot 35, Fig. 17, carried by a pilot support 35' secured to the head 2, receives the advancing stock and supports it firmly while it is being cut by the tool 23. It may be stated that the means for turning down the drill stock, when used, should be inserted at this point in lieu of tube 35, or any other device known in the art may be used for turning and severing the stock.

During the time that the stock is being cut, the blank carrier 3 is advancing with one of its chucks 36, Fig. 24, in axial alinement with the blank which is being severed, the collet 36' being in its expanded position to receive the rear end of said blank. At the proper moment the jaw member of the collet 36' is caused to grip the end of this severed blank. In this way, during the usual forward movement of the carrier 3, a blank is picked up by one of the chucks and by rotation and reciprocating motions of the said carrier, hereinafter described, is moved step by step to each tool or tool station to be operated upon by the instruments thereat. In illustration of this mechanism, reference is most conveniently made to Fig. 14 in which the several parts are shown in operative relation, their specific form being modified in some particulars from that shown in the other figure to better explain their nature and purpose.

The blank carrying device 3, in the general form of a conical support, is rotatably mounted on a shaft 37 together with which it is adapted to reciprocate. A sleeve 38 surrounding the shaft 37 is connected to the carrier to reciprocate by means of a shouldered end 38' and a bolted on collar 38". This construction permits the relative rotation of the carrier 3 and tube 38, while insuring that they reciprocate together. A screw threaded section 39 of the sleeve 38 engages a nut 40, which carries a worm 60 which worm engages with a worm pinion 41, whereby the nut is rotated to move longitudinally the sleeve 38, and thereby the carrier 3 on the shaft 37. The sleeve 38 is prevented from rotating by being splined to the bearing support 40", as indicated at 40ˣ in Fig. 3.

The to and fro movement of the blank carrier 3 through the operation of the devices above mentioned is secured by means of the gears and clutches shown in Fig. 14. The shaft 42, with tight and loose pulleys 43 carries two worm pinions 44 and 45 which engage gears 46 and 47 respectively. The gear 46 is secured to a shaft 48, which is geared to a spindle 49, on which is loosely mounted the gear 47, through a small pinion 50 secured to shaft 48 and a large gear 51 loosely mounted on the spindle 49.

There is also secured on spindle 49 a gear 52, which engages with gear 53 secured on shaft 54. The shaft 54 has secured to it a gear 55 which meshes through a train of gears 56 and 57, with the gear 58 secured on shaft 59. Secured to spindle 54 is the worm 41 which drives the worm gear 60 as above described, which may be formed integral with or secured to nut 40. On shaft 59 is also a worm 61 which drives worm gear 62 which is splined, as indicated at 62' Fig. 3, to shaft 37 and which rotates the latter.

Secured to shaft 48 is a worm 63 which drives worm gear 64 which is attached to clutch element 65', which is loose on shaft 66.

On the shaft 66 is secured a cam wheel 67 operating spring actuated plunger 68 connected with rocking lever 69 which is pivotally connected to clutch 70 splined to spindle 49. On shaft 66 is also an adjustable collar 71 which during the forward movement of shaft 66 engages with bifurcated arm 72 attached to rod 73. The rear end of this latter engages the walls of a notch 87 in plunger 68 to keep the plunger retracted for a predetermined period of time.

The blank carrier 3 carries a gear wheel 74, which engages a pinion 75 on the shaft 66, the gears in the machine illustrated being proportioned so that the blank carrier will be caused to revolve one-sixth of a complete revolution for each revolution of the shaft 66. In order to effect simultaneous longitudinal movement in either direction of the blank carrier and shaft 66, the pinion 75 has flanges which embrace the sides of gear wheel 74. The pinion 63 revolves continuously, being driven by the shaft or spindle 48 which receives its power directly from the shaft 42 through the worm 44 and the gear 46. The shaft 66 is revolved intermittently, through the action of the clutch 65, including the element 65' carried by the worm wheel 64 and the element 65ª splined to the shaft 66. This clutch may be of any suitable construction, and its elements should be so correlated as to engage and effect the rotation of the shaft 66 when the blank carrier is at the end of its rearward movement.

Figure 29:
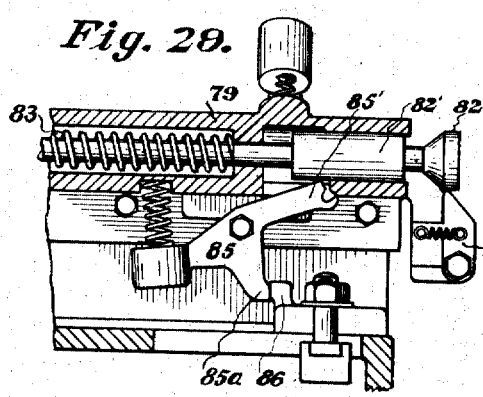
Fig. 29 is an enlarged detail in sectional elevation of the means for locking and releasing the indexing mechanism.
Figure 30:
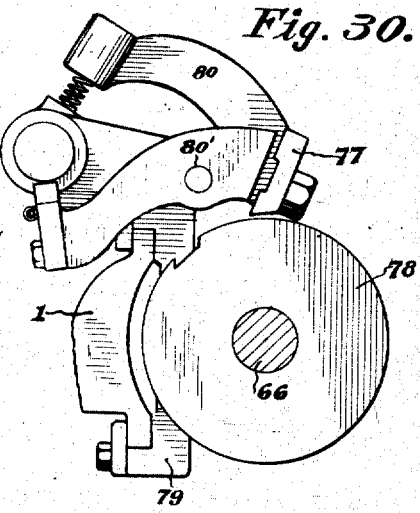
Fig. 30 is an enlarged detail view in elevation of the same.

The shaft 66 is normally prevented from rotating by means of a stop 77, Fig. 30, engaging a notched wheel 78 fast to said shaft 66. A slide 79, Fig. 14, mounted on the frame 1 is reciprocated through the medium of a sleeve 79' loose on the said shaft and positioned between the collars 79ª, 79ª, secured to said shaft so as to move forward and back therewith. Carried by the slide 79 is a rocking arm 80, pivoted at 80' Fig. 30. An extension of this rocking arm member is provided with a spring actuated pivoted dog 81 engaging the forward beveled end of a shouldered spring plunger 82 contained within the slide 79, Fig. 29.

On the forward movement of the blank carrier and shaft 66, the spring 83 surrounding the plunger 82 is compressed by engagement of the forward end of the plunger with adjustable stop 84, on frame 1, Fig. 9, and cocked or retained by means of a pivoted spring pawl 85, carried by the slide 79 and having an arm 85', the free end of which is adapted to be swung into the path of travel of the plunger section 82' to retain the plunger retracted.

On the backward or return movement of this slide 79 when near the extreme limit of its travel, the arm 85ª of pawl 85 encounters a fixed stop 86, Fig. 29, by means of which the pawl arm 85' is swung out of the path of and released from shoulder 82' of the plunger, which latter, under the action of the spring 83, pushes back, and the beveled head 82ª of the plunger rides over the spring dog 81. This rocks the arm 80 about the axis of the pivot 80', frees the stop 77 from the shaft 66, and, the elements of the clutch 65, Fig. 14, being now in engagement, the shaft 66 is given a complete revolution with a resultant one-sixth rotation of the blank carrier 3, whereupon the stop 77, Fig. 30, again enters the notch in the wheel 78, engages the walls thereof and prevents further rotation of the shaft 66 for a predetermined period. The clutch element 65ª, Fig. 14, is provided with friction slippage and drive means, so as to permit necessary slippage in the clutch when the elements 65' and 65ª engage during the rearward movement of the blank carrier 3, before the stop 77 is withdrawn to release the shaft 66 and again when the stop 77 drops into engagement with the notched wheel 78 and before the shaft 66 has moved a sufficient distance forward to effect disengagement of the clutch elements.

By rotation of the shaft 66, the cam wheel 67 is turned through a complete revolution and the plunger 68 is caused to move horizontally by the portion 67ª of cam 67, thereby accomplishing the necessary shifting of the clutch member 70, Fig. 14, to effect its engagement with the clutch gear 51, whereupon the forward movement of the blank carrier is effected by the transmission of power at suitable speed from shaft 42 through pinions 44 and 46, gear wheels 50 and 51, gears 52 and 53, to shaft 54, to the pinion 41 and worm 60.

After this operation has progressed for a given time, the continued forward movement of the shaft 66 brings the adjustable collar 71 into engagement with the bifurcated arm 72, to which is attached plunger 73, the rear end of which has been held in position in engagement with the walls of notch 87 in plunger 68 by means of spring 88. When the plunger 68 is released by the withdrawal of rod 73, it is forced forward by means of spring 89 to throw clutch member 70 into engagement with gear 47, whereupon the shaft 49 through pinion 47 is given a reverse rotation, which imparts to the blank carrier 3 through gears 52, 53, 41 and 60 a quick reverse or backward movement.

At the end of the return movement of shaft 66, the clutch element 65ª, which is splined to shaft 66, engages with constantly rotating sleeve element 65', and thus the shaft 66, together with the cam 67 is caused to rotate. Cam 67 throws rearward plunger 68, which, in turn, through pivoted lever 69 disengages clutch member 70, throws it into a neutral position between the clutch members on gears 47 and 51. While in this position the gear wheel 75 is free to rotate one-sixth of a turn by means of the mechanism heretofore described and illustrated in Figs. 8, 9, 14, 29 and 30.

Figure 22:
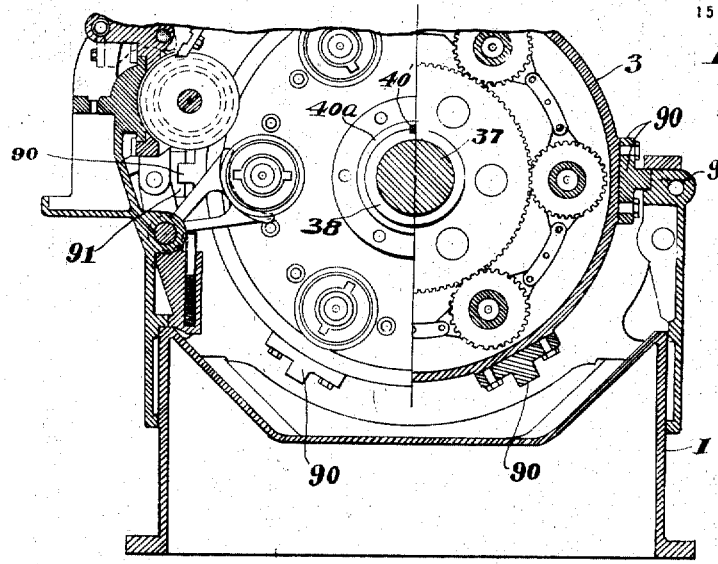
Fig. 22 is a broken section on the line Z Z of Fig. 3.

It is essential that the blank carrier should have a longitudinal movement along absolutely determined lines, and that for such movement it shall be positively held and guided. For this purpose, I provide on the carrier 3, Fig. 22, projections or guides 90 which may be obviously made adjustable, forward, backward and sidewise, if so desired, and these stops register with guide ways 91 on a stationary part of the machine. When by the means above described the blank carrier is turned approximately to the proper extent, each guide 90 engages with the walls of the adjacent guide way 91 and determines with great accuracy the exact position or indexing of the blank carrier in its movement toward the cutters.

By the operations and devices thus far described, the blank stock has been intermittently fed into the machine and cut off in sections. These sections have been successively introduced into the chucks of the blank carrier, intermittently reciprocated and revolved to present them to the several tools which cut the grooves and perform the other operations which they may require. After the blanks have thus been successively presented to all the working or tool stations, they are ejected from the chucks and dropped into a suitable receptacle as finished pieces. The mechanism for effecting the operation of gripping and ejecting the blanks or drills from the chucks will now be described.

At the proper points on the blank carrier there are mounted tubular members 92', Fig. 24, capable of rotation, but not of independent longitudinal movement. Within these members are tubes 92 carrying at their forward ends the collets 36' and retained in position by nuts 93 at their rear ends. On each of said tubular members 92', near the end of the same, is secured by means of pins not shown, a tubular casing 94, within which are pivoted levers 95 with short cam shaped ends. Over this casing is a sliding cover or shell 96, carrying at its inner forward end cam 97 with inclined and flat surfaces.

Referring now to Figs. 10, 11, 12 and 13, 98 is a shaft mounted in the frame 1 so as to be capable of a limited longitudinal movement. 99' is an arm rigid on said shaft and 99ª an arm pivoted thereon. The free ends of said arms extend into the longitudinal path of travel of the shells or covers 96. These arms, however, permit the blank carrier to revolve; they always lie between the shells 96 and the nut 74ª. The pivoted arm 99ª is acted upon by a spring plunger 125 which serves to hold both arms in normal position against a suitable stop.

When the blank carrier is moved forward, as for example, to cause one of the chucks to receive a blank cut from the stock, the arms 99' and 99ª engage the shell 96, tending to press it backward over the tubular casing 94 and bring the cam surfaces 97 over the ends of the cam levers 95. By this means the ends of the latter are caused to engage the nuts 93, which are screwed to the tube 92 and force back the latter a short distance. This draws the collet 36' into its casing and grips the blank which has entered it.

In order to insure the proper action of the cam levers 95 in thus locking the chuck, the rod 18 carries a spiral spring 100, Fig. 10, which engages a sleeve 101 loose on said rod. When the blank carrier advances, a stop ring 108 compresses this spring by engagement with a spring controlled pawl 103 pivoted on the sleeve 101. Normally the head of the pawl 103 lies in the path of the stop ring 108, and by the advance of the latter, the pawl is forced into engagement with an adjustable fixed stop 105, which turns it and causes it to slip from said ring 108, releasing the spring 100 and causing the sleeve 101 to strike shoulder or projection 106. The sleeve, being capable of longitudinal movement with the shaft 98, the sudden release of the spring acting upon it, imparts an impact that drives the levers 99' and 99ª against the shell 96 and insures the proper engagement of the cam levers 95 with the cam surfaces 97.

In its movement toward the ejecting stop 111, the shell 96, as shown in Fig. 6, is engaged by two pivoted spring actuated arms 112, carried by the fixed support 112' for the ejecting stop 111, and by means of such arms is forced forward, whereby the cams or projections 97, Fig. 10, are carried away from the ends of the levers 95, releasing the latter and thereby loosening the finished blank in the collet 36'. Within the tube is a spring actuated sliding rod, 109, the rear end of which projects through the nut 93' and the forward end of which projects into the chuck 36' in the form of a pin 110. Near the backward limit of travel of the rod 109 its end comes into engagement with said pivoted ejector stop 111, which throws the rod 109 forward and ejects the finished blank or drill from the collet 36'.

It will be borne in mind that the blank carrier does not revolve until it is nearly or quite at its extreme rear position. In operation, therefore, while the chuck containing the finished drill will be operated and its plunger advanced by the stop 111, the part 96 of the next succeeding chuck will be revolved in between the spring actuated arms 112, the pivotal mounting and spring control of the arms insuring that the rear end mechanism for the advancing chuck may enter between the arms 112 without hindrance from them. Likewise these springs tend to hold the ejector stop 111 in normal position and permit the stop, the free end of which is beveled, as shown in Fig. 5, to be turned aside by the end of the incoming rod 109. When the blank carrier has advanced and again returned, this particular rod 109 will engage with the stop 111, which has swung back into its normal position.

In the process of cutting grooves in drills for example, it is necessary that each drill be rotated during the cutting process as well as advanced toward the cutting tools, in order that the tool may cut spiral or helical grooves therein. The means for accomplishing this function is illustrated in Figs. 3, 4 and 14.

The spindle 54, as previously described, is geared to the sleeve 118, Fig. 3, which is splined at 62' to the main shaft 37 and slides thereon. By this means a rotary motion at relatively low speed is imparted to the main shaft 37 and through it by means of a gear wheel 119, rigidly secured thereon, to pinions 120 secured to tubular members 92', mounted in the blank carrier, see Fig. 14, and this motion in connection with an advancing motion of the blank with respect to the tools causes the latter to trace a spiral path on and to cut a spiral groove in the blanks.

In machines of this kind, it is desirable that some means be provided whereby the depth of cut may be regulated or varied. For example, it is necessary that the tools in their normal operations shall cut grooves in the blanks which are progressively shallower in order that the spirals in the finished drills may be deeper at the cutting end of the latter than at their upper portions. To accomplish this object, I employ any devices that will separate the cutting tools more or less at the desired points in their operation, the specific means adopted for the purpose being shown in Figs. 3, 20 and 21.

From the nature of the construction and mode of operation of the machine above described, it will be observed that the blank carrier and its connected parts must be fixed to the shaft 37 so far as longitudinal motion is concerned, and that said shaft moves to and fro in the operation of the machine. This movement is taken advantage of to shift the position of the tool holders and thereby vary the depth of cut made by the tools, and in the present case, where the latter are designed to cut a shallower groove at the ends, I attach to the forward end of the shaft a conical extension 121 over which travels the end of a pivoted arm 122, operating a worm pinion 128. As the shaft 37 advances, the anti-friction roller on the end of the arm or lever 122 rides up the incline or conical extension on the shaft and thereby imparts a partial rotation to the worm 123. This movement of the worm pinion is communicated to a worm gear 128 secured to a sleeve 129 which is free to turn through a limited arc and by such sleeve 129, by means of a gear 132 secured thereon, to the segmental gears or quadrants 131, fixed to the heads that carry the cutting tools 130. Each segment 131 is secured to a bushing 131' and also a swivel head 187 which latter is in turn mounted in the stationary head 2 of the machine.

In this way the tools are separated at or near the end of the travel of the shaft 37, but it is evident that by the use of suitable cams in place of the extension 121, any desired movement may be imparted to the cutters during their operation.

On the part 121 is shown a shoulder 121ª which has an important bearing in the operation of the machine, in that when the roller on arm 122 strikes the shoulder 121ª, it is rapidly forced backward, thereby rotating the worm 128, and in this way quickly removes the cutters from the grooves, thereby allowing the blank carrier 3 to return without dragging the cutters 130 in the grooves of the drill. When the roller on the arm 122 has thus been widely separated from the axis of the shaft 37, it is brought again in contact with the cam 121 by means of the adjustable sleeve or closer 133 on the extension on the shaft 37. It will be seen that when the shaft 37 reaches the end of travel in its quick backward movement, the flaring end of the sleeve 133 encounters the roller on the arm or lever 122 and forces it down in contact with the straight portion of the extension 121 on shaft 37 whereby its proper subsequent movement as it travels over said extension and up the conical part of the same is assured.

The cutting tools 130 are carried by heads 136, each of which is secured to a swiveling head 187 connected with one of the segmental gears or quadrants 131, and it will be observed that each tool of a coöperating pair is carried by a different head. Each cutter head 136 is adjustable with respect to the swiveling head 137 upon which it is mounted in order that the tools may be set primarily to cut grooves of proper depth. And as will be noted, I have shown two cutter heads on each swiveling head at intermediate tool stations between the first and last.

For this purpose, I have shown each cutter head, in the machine illustrated in the drawings, formed with a couple of curvilinear slots 180', concentric with the axis of the tool driving shaft 138. 139 are bolts which enter said slots and secure the cutter head 136 in any desired position on the adjacent swiveling head 137. Each of the cutting tools 130 is secured to the outer end of a shaft 140 mounted in a bearing 140ª, carried by a cutter head. The inner end of each shaft 140 has secured to it a spiral gear 141 which meshes with a spur gear 142 secured to the outer end of the driving shaft 138.

The tools with which the blanks are last brought into engagement are those indicated by 158 and 159 which make the relief or clearance cut and reduce the diameter of the blank along the edges of the grooves. Each of these tools is operated by a different head 152, 152. It is essential to separate these clearance cutters at the end of the forward movement of the shaft 37 in order to get them out of contact with the blank, and for this purpose I employ the devices shown in Figs. 21, and 33 to 35 inclusive. Each of the clearance tools is carried by a shaft 150 mounted in a bushing 151 which in turn is mounted to move longitudinally in the head 152 which is swiveled on the outer end of an adjacent bushing 131' at the last station. Adjacent its outer end each of the bushings 151 carries a rack 153 geared to a pinion 154 carried by a shaft 154' loosely mounted in the head 152. 160 are arms, each rigidly secured at its lower end to one of the shafts 154'. 161, 162 are adjustable set screws for limiting the movement of the free ends of the arms 160 toward each other. These arms 160 are kept in contact with each other by means of a spring 163 until separated by the action of a slide 164 which is forced between the pivoted extension 160ª on arms 160. This slide is actuated by the advance of the blank carrier 3 coming in contact with the rear end of a rod 165 to which the slide 164 is secured by an arm 165ª. The rod 165 is mounted in a tube 166, a spring 167 serving normally to press it rearwardly. The mechanism is timed so that the free ends of the arms 160ª will ride off the rear end 164' of the slide 164 and permit the spring 163 to draw together the adjustable stops 161, 162, at the moment when it is desired to separate the clearance cutters 158 and 159 from the drill blank. A spring 160ᵇ tends to return the pivoted arms 160ª to normal position.

In order to hold the two relieving cutter heads 152, 152, securely on the tubular supporting arms 131', 131', mounted on the head 2, and also to have them simultaneously adjustable axially as well as pivotally, or angularly relative to the axis of the blank as it is presented to the clearance cutters by the blank carrier, so that the margin 194' on the blank 194 is cut to the proper width by the cutters 158 and 159, I employ a pivotally adjustable tubular support 195 mounted in the head 2 in the same axial plane as the cutter heads 152, 152. The support 195 can be moved horizontally, that is axially, by means of rack teeth cut around same and a pinion 196 mounted in the head 2 and can be clamped in position by means of set screw 197 also mounted in head 2.

The relieving cutter heads 152, 152 are secured to the support 195 by a flange 195' on same with radial slots 198 through which studs 199, fastened rigidly to the heads 152, 152 project, and which clamp together securely the relieving cutter heads and support 195. By this means the relieving cutter heads 152, 152 travel horizontally or axially together with the support 195 when the latter is moved in or out by turning the pinion 196.

The pivotal or angular movement of the relieving cutter heads 152, 152 is produced by turning the support 195 on its axis, whereby the relieving cutter heads 152, 152 are turned through the medium of the studs 199. This adjustment is relatively limited but sufficient for practical purposes.

The pilot or guide 200 for the blank 194 which is being operated on by the relieving cutters is secured in the ends of the support 195 and hence is always in correct relative position horizontally and pivotally to the relieving cutters for all positions of adjustment of the support 195.

With reference to the head portion of the apparatus, it again may be pointed out that the main driving shaft 42 gears with a large gear wheel 126 which in turn gears with the gear wheels 146 that operate the cutting tools and with the pinion 119 that imparts rotation to the stock, as has heretofore been explained, and as will be understood by reference to Figs. 17, 19 and 23.

In order to stop the machine, either by hand when so desired, or automatically, in case the blank carrier travels too far in either direction or starts to turn at the wrong point, the device shown in Figs. 8 and 9 are employed. These consist of a reciprocating rod 247 operated either by the hand lever 248 or automatically. The rod 247 carries stops 249, 250 and 251, the first and last of which determine the limits of the to and fro movement of the blank carrier, while the stop 250 controls the turret turning throw-out. The latter stop prevents the blank carrier from going forward in case it should not be rotated to the proper position for the blanks to be machined by the tools. Stop 250 will be engaged by part 80, Fig. 30 and stop the machine, unless stop 77 is engaged in the slot in the index disk 78. The rod 247 is to be suitably connected with the means for stopping and starting the machine so that its movement in either direction will effect these operations.

Figure 31:
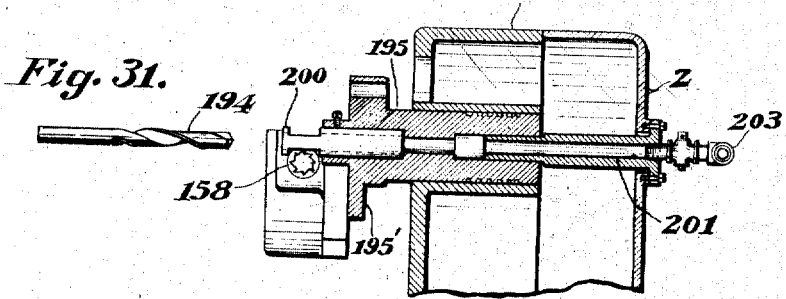
Fig. 31 is a sectional view illustrating the oiling devices for the clearance cutters.
Figure 32:
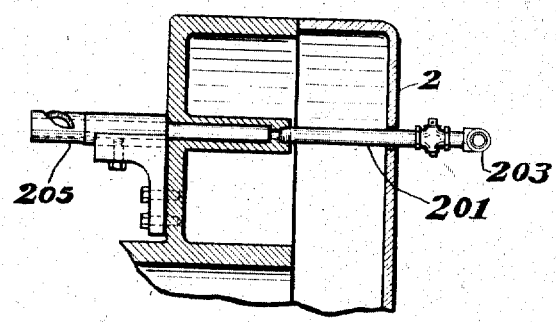
Fig. 32 is a sectional view illustrating one of the oiling devices for the milling cutters which cut the grooves in the blanks.

In order to oil the cutter heads I have arranged to force oil through the pilots at the different tool stations. In Fig. 31, I have illustrated this oiling system for the clearance cutters. The rear end of the tubular pilot 200 is connected with an oil conduit 201 which extends through the head 2 and is connected with an oil supply duct 203 at the front of the head. The duct 203 is connected with a suitable source of oil supply (not shown) there being a pump or suitable device in the supply line for forcing the lubricant through it under sufficient pressure to tend to force or wash cuttings or chips out of the openings in the pilot while at the same time lubricating the cutters. In Fig. 32 I have illustrated the oiling system at one of the tool stations ahead of the station for the clearance cutters, the parts being similar excepting that the cutter openings in the pilots 205 are differently shaped in order to properly accommodate the cutter tools.

By injecting oil in this way the chips are washed away and a better result secured, than if the oil were fed around over the cutters. In fact, I have found this oiling system insures entirely free feed of the blanks in either direction, within the pilots.

Fig. 37 is an enlarged detail of a drill in which the grooves have been cut and showing the relief cutters operating thereon. This figure illustrates the function of these cutters. In Fig. 36 a portion of a complete drill 194 is shown with grooves therein in untwisted section to illustrate their gradual decrease in depth of cut from the point of the drill backward.

The invention embodying the apparatus above described is not limited to the features specifically shown, and may be greatly varied. For example the machine as a whole may be vertical instead of horizontal and the several principal movements effected at right angles to the lines described.

Again the number of work stations or points of stoppage of the blank holder is very largely immaterial. I have shown in the present case six, and in a highly organized and perfected machine such as I have selected in illustration of the improvements, I now believe this is the most advantageous number. With small drills and other tools, however, this number may be profitably reduced.

The adjustments, of the cutting tools, for example, I have not elaborated upon. They are, however, of prime importance for by utilizing them, I am enabled to graduate or vary the operations at the several work stations to meet the best conditions of practical operation. The last pair of groove cutters, for example, may be adjusted to make a much shallower cut than the others and other adjustments made which may greatly facilitate the operation of the machine and the preservation of the cutters.

Another feature of importance is the means for separating the cutters automatically. While this is shown and described as designed and used for a specific purpose, it is manifest that by means of the same or similar devices the operation of the cutters may be varied at will. That is to say, they may be caused to separate or come together in many other ways and at such times as the requirements of special work may demand.

The special means for feeding the blanks into the machine may be of any kind known in the art. Various forms of feeding mechanism are known and used. For example, the blanks may be severed in advance from a bar or rod and turned and prepared so as to be fed from a suitable magazine. Again the rod may be fed and turned by the machine itself before delivery to the chucks and the sections may be entirely severed before introduction into the chucks or only partially severed and twisted off by the chucks themselves. All of these are old and well known devices and have long been in practical use.

It will be noted that the clearance cutter 158—159 may be substantially universally adjusted with reference to the axis of the blank 194, as presented to them by the blank carrier. By introducing a screw driver or suitable tool into the slot at the exposed end of a shaft 154' which carries one of the pinions 154 which meshes with the rack 153, the clearance cutter connected therewith may be moved to and fro laterally or radially with reference to the axis and the blank 194.

By adjusting the support 195 to and fro along its axis, which is coincident with the axis of the blank 194, the tools 158—159 are given axial adjustment relative to the blank 194. Angular adjustment of these clearance tools with reference to the axis of the blank 194 may be obtained by turning the support 195 about its axis, the connections of this support with the cutter heads carrying cutter tools 158—159 permitting slight angular adjustment. The various adjustments of the clearance cutters I find of great importance in the production of high grade drills.

To those skilled in the art of making apparatus of the class described, many alterations in construction and widely differing embodiments and applications of my invention will suggest themselves, without departing from the spirit and scope thereof as set forth in the claims. My disclosures and descriptions herein are purely illustrative and are not intended to be in any sense limiting.

What I claim is:

1. In a machine of the kind described, the combination with a movable stock feeder and means for gripping the stock for a predetermined interval of time, of a blank carrier, and means actuated by the movement of said blank carrier for operating said stock feeder and said gripping means.

2. In a machine of the kind described, the combination with a reciprocating stock feeder and means for gripping the stock for a predetermined interval of time, of a reciprocating blank carrier, and means actuated by the movement of said blank carrier for reciprocating said stock feeder and operating said gripping means.

3. In a machine of the kind described, the combination with a reciprocating stock holder and means for gripping the stock therein when advanced to its normal position, of a reciprocating blank carrier and a rigid rod extending from the same and engaging with the stock holder, whereby the latter is advanced by the movement of the carrier, as set forth.

4. In a machine of the kind described, the combination with a rotary stock holder, of a cutting tool for severing sections from the stock, a movable blank carrier, and means actuated by the movement of said carrier for forcing the cutting tool into engagement with the stock during predetermined intervals.

5. In a machine of the class described, the combination with a rotary stock holder, of a cutting tool for severing sections from the stock, a movable blank carrier, means actuated by the movement of said carrier for forcing the cutting tool into engagement with the stock during predetermined intervals, and means for automatically returning the cutting tool to normal position.

6. A machine for cutting grooves in twist drills or other articles comprising a tool holder, a plurality of cutting tools swiveled to such tool holder, a work holder, and a reciprocating member movable by the work holder for controlling the swiveling movement of the cutting tools.

7. In a machine for cutting grooves in twist drills or other articles, a tool holder, a plurality of cutting tools swiveled to such tool holder, a work holder, in combination with means for effecting a swiveling movement of said cutting tools comprising a reciprocating member movable with the work holder, and means operatively connected to such cutting tools and actuated by the movement of said movable member.

8. In a machine of the kind described, the combination with a rotary stock feeder, of a cutting tool for severing sections therefrom, a tool post upon which the tool is mounted and capable of movement toward and from the line of travel of the stock, a reciprocating blank carrier and a cam operated by the movement of said carrier to force the cutting tool into engagement with the stock and sever sections of the same to form blanks for the drills or other devices as set forth.

9. In a machine of the kind described, the combination with a reciprocating stock holder, of a reciprocating blank carrier having chucks to receive and grip the blanks severed from the stock, the said chucks being composed of inner and outer members movable relatively to each other, the inner member being adapted to be shifted to operate the chuck, an abutment on said inner member and levers for forcing the same back when turned, and a cam for turning said levers operated by the movement of the reciprocating blank carrier.

10. In a machine of the kind described, the operating mechanism for the blank holding chucks, comprising the combination with a reciprocating blank carrier, of inner chuck members adapted to be shifted to operate the chuck, and having abutments thereon, levers adapted to engage and move said abutments, cams for moving said levers operated by the reciprocating blank carrier, a spring adapted to be put under tension by the movement of the blank carrier and released at a given point to thereby deliver a sudden impact to the said cams and insure the proper engagement therewith of the said lever.

11. In a machine of the kind described, the operating mechanism for the blank holding chucks, comprising the combination with a reciprocating blank carrier, of inner chuck members adapted to be shifted to operate the chucks and having abutments thereon, levers adapted to engage with and move said abutments, a cam carrier movable with respect to the levers and operating the same, and a spring adapted to be put under tension by the movement of the blank carrier and released by the same at a given point to expend its energy upon the movable cam holders to force the same into full operative engagement with the chuck operating levers, as set forth.

12. In a machine of the kind described, the combination of a blank carrier having a chuck to receive and grip the blank, said chuck being composed of inner and outer members, movable relative to each other, the inner member being adapted to be shifted to operate the chuck, an abutment on said inner member, levers for forcing said abutment back when turned, a cam for turning said levers, and means controlled by the movement of the blank carrier for delivering at a predetermined interval an impact blow to said cam to operate the chuck.

13. In a machine of the kind described, the combination with a reciprocating blank carrier, a chuck for gripping blanks carried thereby, said chuck including elements movable in the direction of travel of the blank carrier for operating the chuck to grip the blanks, and means actuated by the movement of the blank carrier for delivering an impact blow to one of said relatively movable chuck elements, to cause the chuck to grip a blank.

14. In a machine of the kind described, the combination of a reciprocating blank carrier, blank gripping and releasing means carried thereby and including relatively movable chuck elements, and means for moving one of said chuck elements relative to the other by an impact blow, which latter means are actuated by the movement of said blank carrier.

15. In a machine of the kind described, the combination with a reciprocating blank carrier normally locked against rotation, of a spring adapted to be compressed by the movement of the said carrier backward and released by the forward movement of the same at a predetermined point in its travel, a plunger operated by said spring, means to rotate the carrier and a controlling pawl operated by the plunger to lock or release the means imparting rotation to the carrier, as set forth.

16. In a machine of the class described, the combination with a reciprocatable blank carrier and means for imparting a step by step rotary movement thereto, of means for imparting a slow longitudinal advance and a quick return movement to said blank carrier, and means actuated by the longitudinal movement of said blank carrier for controlling the operation of the aforesaid means.

17. In a machine of the kind described, the combination with a reciprocatable blank carrier and means for imparting step by step rotary movement to said blank carrier, of means for controlling said step by step rotary movement, including a controlling pawl and notched disk, and means for withdrawing said pawl from said notched disk, operated at a predetermined point by the longitudinal movement of the blank carrier.

18. In a machine of the kind described, the combination of a reciprocatable blank carrier, means for imparting step by step rotary movement thereto, means for controlling the operation of said last described means, including a controlling pawl and a notched disk, and means actuated by the movement of said blank carrier in one direction for the effecting the separation of said controlling pawl and notched disk at a predetermined instant to permit the operation of said step by step rotating means.

19. In a machine of the kind described, the combination of a reciprocatable blank carrier, means for imparting step by step rotary movement thereto, means for controlling the operation of said last described means, including a controlling pawl and a notched disk, and tripping means for said controlling pawl set by the forward movement of said blank carrier, and released at a predetermined point in the rear movement of said blank carrier.

20. In a machine of the kind described, the combination of a reciprocatable blank carrier, means for imparting step by step rotary movement thereto, including a clutch with friction elements, and means for controlling said step by step rotary movement, including a controlling pawl, notched disk and a tripping device for said pawl operated by the to and fro movement of said blank carrier.

21. In a machine of the kind described, the combination with a reciprocating rotary blank carrier, of a means for advancing and returning, and a means for rotating the same, clutches for controlling the means for imparting the said movement to the said carrier through gears, a cam actuated lever operated by the longitudinal movement of the carrier for operating said clutches and thereby imparting to the carrier advance and return movement, and a frictional or slipping connection between the means for rotating the carrier and the driving gears, as set forth.

22. In a machine of the class described, the combination with a reciprocatable and rotatable blank carrier, of means for advancing and returning and means for rotating the same, including a shaft arranged to reciprocate with said blank carrier and carrying the controlling means for limiting the forward and rearward movement of the carrier, and also the controlling means for determining the step by step rotation of the carrier.

23. In a machine of the kind described, the combination with a reciprocating rotary blank carrier, of a means for advancing and returning and a means for rotating the same, clutches for controlling the means for imparting such movement to the carrier through gears, a cam lever adapted to operate such clutches at predetermined intervals so as to impart forward and reverse movement to the carrier, and means controlled by the longitudinal movement of the carrier to operate said cam, as set forth.

24. In a machine of the kind described, the combination with a reciprocating rotary blank carrier, of a shaft for rotating the same, means for intermittently rotating said shaft so as to impart fractional rotation to the carrier, said means comprising an index wheel intermittently freed for rotation by the longitudinal movement of the carrier, and a means controlled by said movement of the carrier for connecting the driving means to the said shaft, as set forth.

25. In a machine of the kind described, the combination with a reciprocating blank carrier and means for imparting longitudinal movement thereto, an index wheel, means determined by the position of the carrier for imparting an intermittent movement to the index wheel, and means controlled thereby for determining the direction of the longitudinal movement, as set forth.

26. In a machine of the kind described, the combination with a reciprocating rotary blank carrier having a blank holding chuck rotatable about its axis and a supporting shaft for said carrier, of means for imparting rotary movement to said blank holding chuck during the longitudinal movement of said carrier, comprising gearing interposed between said blank holding chuck and the supporting shaft for said carrier.

27. In a machine of the class described, the combination with a reciprocating rotary blank carrier containing blank holding chucks, a supporting shaft for said carrier, of means for reciprocating the blank carrier comprising a screw and nut device surrounding said supporting shaft.

28. In a machine of the kind described, the combination with a reciprocating blank carrier, containing blank holding chucks and a supporting shaft for said carrier, of means for reciprocating said carrier comprising a screw and nut device surrounding said shaft, and means operatively connected to said screw and nut device for effecting a slow advance and a quick return of said blank carrier.

29. In a machine of the class described, the combination with a reciprocating blank holding turret containing blank holding chucks and provided with gear teeth thereon, of means for reciprocating said turret, and longitudinally movable means for rotating the same comprising a gear constantly in mesh with the teeth on said turret.

30. In a machine of the class described, the combination with a reciprocating blank holding turret containing blank holding chucks, and provided with gear teeth thereon, of means for reciprocating said turret, and means for rotating the same comprising a gear provided with flanges to engage with the sides of the turret gear teeth and cause said gear to participate in the reciprocations of the turret.

31. In a machine of the kind described, the combination with a reciprocating rotary blank carrier containing blank holding chucks, of means for imparting longitudinal and rotary motion thereto, and a means for imparting a partial rotation to the blank holding chucks through the revolution of its supporting shaft, as set forth.

32. In a machine of the kind described, the combination with a reciprocating blank carrier containing blank carrying chucks, a shaft upon which the carrier revolves, gearing between the shaft and the chucks, means for imparting a reciprocating movement to the shaft, means for imparting intermittent movement of rotation to the carrier, and means for imparting rotation to the chucks through the shaft, as set forth.

33. In a machine of the kind described, the combination with a reciprocating blank carrier and shaft, of a tool holder or head and tools to which the blanks are presented, the said tools being mounted on adjustable heads, sleeves with which said heads are in gear, and a worm operated by the longitudinal movement of the carrier shaft to turn said sleeves and thereby adjust the heads carrying said tools, as set forth.

34. In a machine of the kind described, the combination with a tool holder, rotary cutting tools mounted thereon, and means for presenting blanks to the tools, of means for simultaneously separating the cutting tools in the arcs of circles during their operation upon the blanks and in order to vary the depth of the cuts made by them.

35. In a machine of the kind described, the combination with a tool holder, rotary cutting tools mounted in pairs thereon, and means for presenting blanks to the tools, of means for separating the cutting tools of each pair by moving them in curvilinear paths during their operation upon a blank in order to vary the depth of the cut made by them.

36. In a machine of the kind described, the combination with a tool holder, rotary cutting tools mounted in pairs thereon, and means for presenting blanks to the tools, of means for separating the cutting tools of each pair by moving them in curvilinear paths during their operation upon a blank in order to vary the depth of the cut made by them, and also to separate them from said blank when it is being withdrawn from the tools.

37. In a machine of the class described, the combination of a tool holder or head, swiveled cutter heads mounted in said holder, cutting tools arranged in pairs, one tool of each pair being mounted on adjoining swiveled cutter heads, connections between said cutter heads, whereby the angular adjustment of one cutter head will effect the separation of two cutting tools, one of one pair and the other of another pair of cutting tools.

38. In a machine of the kind described, the combination of a plurality of swiveling heads, a plurality of cutting tools mounted on each of said swiveling heads, each of said cutting tools constituting one tool of a pair of cutting tools, means for presenting blanks to said pairs of cutting tools, and means for angularly adjusting said swiveling heads, whereby a plurality of cutting tools of different pairs of tools are simultaneously separated.

39. In a machine of the kind described, the combination of a plurality of swiveling heads, a plurality of cutting tools mounted on each of said swiveling heads, each of said cutting tools constituting one tool of a pair of cutting tools, means for rotating said cutting tools, means for presenting blanks to said pairs of cutting tools, and means for angularly adjusting said swiveling heads, whereby a plurality of cutting tools of different pairs of tools are simultaneously separated.

40. In a machine of the kind described, a plurality of swiveling heads, a plurality of cutter heads for each swiveling head, each cutter head independently adjustable angularly on its swiveling head, and a cutting tool mounted on each cutter head, each of said cutting tools constituting one tool of a pair of cutting tools, the other tool of each pair being carried by an adjoining swiveling head.

41. In a machine of the kind described, a plurality of swiveling heads, a plurality of cutter heads for each swiveling head, each cutter head independently adjustable angularly on its swiveling head, and a cutting tool mounted on each cutter head, each of said cutting tools constituting one tool of a pair of cutting tools, the other tool of each pair being carried by an adjoining swiveling head, and means for adjusting said swiveling heads during the operation of the cutting tools to separate the tools of each pair.

42. In a machine of the kind described, the combination of a tool holder or head, a plurality of swiveling heads mounted in said holder, a plurality of cutting tools carried by each swiveling head, means mounted in said swiveling heads to rotate said cutting tools, each tool of a coöperating pair of tools being carried on an adjoining swiveling head, means for presenting a blank to a pair of tools, and means for adjusting the swiveling heads during the operation of the tools whereby the tools of each pair are separated.

43. In a machine of the kind described, the combination with a reciprocating rotary blank carrier, a blank holding chuck rotatably mounted in said carrier, a tool head, a rotary cutting tool mounted in said head, a rotary shaft, and means while the cutting tools are acting upon the blank and during the reciprocating movement of said carrier for transmitting rotary movement from said shaft to said blank holding chuck.

44. In a machine of the kind described, the combination with a reciprocating rotary blank carrier, a blank holding chuck rotatably mounted in said carrier, a tool head, a rotary cutting tool mounted in said head, a rotary shaft, and means while the cutting tools are acting upon the blank and during the advancing movement of the carrier for transmitting a constant rotary movement from said shaft to said blank holding chuck to cause the cutting tool to cut a spiral groove of constant pitch in the blank.

45. In a machine of the kind described, the combination of a tool holder or head, a plurality of swiveling heads mounted in said holder, a plurality of cutting tools carried by each swiveling head, means mounted in said swiveling heads to rotate said cutting tools, each tool of a coöperating pair of tools being carried on an adjoining swiveling head, a reciprocating blank carrier for presenting blanks to said pairs of tools and means interposed between said blank carrier and swiveling heads, co-acting to adjust said swiveling heads and separate the tools of each pair of tools during the movement of said blank carrier.

46. In a machine of the kind described, the combination with cutting tools and a device upon which the cutting tools are placed and a blank carrier, the two being capable of reciprocating movement toward and from each other, of means mounted on the tool holder and operated by the reciprocating movement of the blank carrier to vary the adjustment of the cutting tools toward and from one another by moving them in the arcs of circles.

47. In a machine of the kind described, the combination with a tool holder and a blank carrier capable of reciprocating movement which brings the blanks into engagement with the tools, of a cam movable with the blank carrier, means operated thereby to separate the cutting tools, the cam having an abrupt portion to impart a quick separating movement to the cutting tools at the end of the movement of the blank carrier, as set forth.

48. In a machine of the kind described, the combination with a tool holder and a blank carrier capable of reciprocating movement which brings the blank into engagement with the tool, of a cam movable with the blank carrier, means operated thereby to separate the cutting tools, and means for imparting a quick separating movement to the cutting tool at the end of the movement of the blank carrier whereby the blank carrier is returned without the cutters dragging in the grooves of the drill.

49. In a machine of the kind described, the combination with a tool holder and a blank carrier capable of reciprocating movement which brings the blanks into engagement with the tools, means actuated by the movement of the blank carrier for separating the cutting tools including means for imparting a quick separating movement to said cutting tools at the end of the movement of the blank carrier whereby the blank is returned without the cutters dragging in the grooves of the drill.

50. In a machine of the kind described, the combination with a tool holder and a blank carrier capable of reciprocating motion which brings the blanks into engagement with the tools, of a cam movable with the blank carrier, means operated thereby to vary the adjustment of the tools, and a ring secured to the cam to effect a quick separation of the tools at the end of the movement of the blank carrier, as set forth.

51. In a machine of the kind described, the combination of a plurality of swiveling heads, a plurality of cutting tools mounted on each of said swiveling heads, each of said cutting tools constituting one tool of a pair of cutting tools of which the other tool is carried by another swiveling head, means for presenting blanks to said pairs of cutting tools, and means interposed between said blank presenting means and said swiveling heads for angularly adjusting the latter.

52. In a machine of the kind described, the combination with a reciprocating blank carrier, of a means for disengaging the chucks from the blanks, comprising chuck locking cam mechanism, and spring actuated arms with which said cam mechanism is moved into engagement and by which the cams are moved and released by the backward movement of the carrier, as set forth.

53. In a machine of the kind described, the combination with a stationary support and pairs of cutting tools carried thereby, of a reciprocating blank carrier for a plurality of blanks, means controlled by the movement of the blank carrier for varying the adjustment and depth of cut of all the tools except the last pair, and a part movable with the blank carrier for engaging and separating the last pair of cutting tools at the end of each movement of the blank carrier as set forth.

54. In a machine of the kind described, the combination of a pair of clearance cutters, means for presenting a blank to said cutters, and means for simultaneously adjusting said cutters axially and angularly with respect to the axis of said blank.

55. In a machine of the kind described, the combination with a tool holder and a blank carrier movable with respect thereto, of relief cutters mounted in heads which are rotatable on the tool holder, means for adjusting the cutters in the direction of their axes, and means for rotatably adjusting said heads.

56. In a machine of the kind described, the combination with a tool holder and a blank carrier movable with respect thereto, of relief cutters on the tool holder and a blank carrier movable with respect thereto, means for simultaneously adjusting said cutters longitudinally and pivotally with respect to the axis of the blank and means for adjusting said cutters longitudinally with respect to their own axes.

57. In a machine of the kind described, the combination of a pair of clearance cutters, means for presenting a blank to said cutters, and means for adjusting said cutters angularly, axially and laterally with respect to the axis of said blank.

58. In a machine of the kind described, the combination of a pair of clearance cutters, means for presenting a blank to said cutters, and means for adjusting said cutters angularly and axially with respect to the axis of the blank.

59. In a machine of the kind described, the combination of a pair of clearance cutters, means for presenting a blank to said cutters, and means for adjusting said cutters axially and laterally with respect to the axis of said blank.

60. In a machine of the class described, the combination of a pair of relatively stationary rotatable clearance cutters, means for rotatably presenting a blank to the action of said cutters, means for simultaneously withdrawing said cutters from the blank to permit the return of the latter to normal position and means for simultaneously adjusting said cutters with respect to the axis of the blank.

61. In a machine of the class described, the combination of a pair of clearance cutters, of means for presenting a blank to the action of said cutters, means for withdrawing said cutters from the blank at a predetermined point to permit the return of the latter to normal position and means for simultaneously adjusting said cutters with respect to the axis of the blank.

62. In a machine of the class described, the combination of a pair of clearance cutters, of means for presenting a blank to the action of said cutters, positive means for maintaining a fixed relation between said cutters while the latter are acting upon the blank, means for automatically actuating the positive means to inoperative position whereby said cutters are adapted to be withdrawn from the blank at a predetermined point to permit the return of the latter to normal position and means for adjusting said cutters with respect to the axis of the blank to accommodate various sizes thereof.

63. In a machine of the class described, the combination of a pair of relatively fixed rotatable clearance cutters, of reciprocating means for presenting a blank to the action of said cutters, means for rotating said blank during the cutting action, means for positively maintaining a fixed relation between said cutter while the latter are acting upon the blank, means for automatically actuating the positive means to inoperative position whereby said cutters are adapted to be withdrawn from the blank at a predetermined point to permit the return of the latter to normal position, and means for adjusting said cutters with respect to the axis of said blank to accommodate various sizes thereof.

64. In a machine of the class described, the combination of a relatively fixed tool carrier, clearance cutters simultaneously movable thereon, of a reciprocating blank carrier for presenting a blank to the action of said cutters, positive means for maintaining a fixed relation between said cutters while the latter are acting upon the blanks and automatically actuated by the blank carrier at a predetermined time to an inoperative position whereby said cutters are adapted to be simultaneously withdrawn from the blank at a predetermined point to permit the return of the latter to normal position, and means for adjusting said cutters with respect to the axis of the blank to accommodate various sizes thereof.

65. In a machine of the class described, the combination of a relatively fixed tool carrier, clearance cutters simultaneously movable thereon, of a reciprocating blank carrier for presenting a blank to the action of said cutters, positive means for maintaining a fixed relation between said cutters while the latter are acting upon the blank and automatically actuated by the blank carrier at a predetermined time to an inoperative position whereby said cutters are adapted to be simultaneously withdrawn from the blank at a predetermined point to permit the return of the latter to normal position, and means for simultaneously adjusting said cutters angularly to accommodate different thicknesses of blanks, and means for simultaneously adjusting the same axially with respect to the blank to accommodate various lengths of blanks.

66. In a machine of the class described, the combination of a fixed tool carrier, relatively stationary rotating head mounted upon said tool carrier, clearance cutters carried by said rotating heads, means for simultaneously rotating said heads to determine the character of a cut, means for simultaneously moving said cutters axially to accommodate blanks of various thickness and means for simultaneously moving said heads axially to accommodate blanks of varying lengths.

67. In a machine of the class described, the combination of a fixed tool carrier, relatively stationary rotating head mounted upon said tool carrier, clearance cutters provided with shafts rotatably mounted in said rotating heads, means for rotating said heads to accommodate blanks of varying thickness, and means for simultaneously rotating the cutter shafts to form the clearance.

68. In a machine of the class described, the combination of a fixed tool carrier, relatively stationary heads rotatably mounted upon said tool carrier, clearance cutters provided with shafts rotatably mounted in said rotating heads, means for rotating said heads to determine the character of the cut, means for moving the cutters axially of their shafts to accommodate various thicknesses of blanks and to separate said cutters from the blanks, means for moving said heads axially to accommodate blanks of varying lengths, and means for simultaneously rotating said cutters to form the clearance.

69. In a machine of the class described, the combination of a fixed tool carrier, relatively stationary heads rotatably mounted on said tool carrier, clearance cutters provided with shafts rotatably mounted in said rotating heads, means for rotatably adjusting said heads to determine the character of the cut, means for moving the cutter axially of their shaft toward and from the blank, and means for rotating each of said cutters comprising a power shaft the axis of which is coincident with the axes of each rotatable head, and means for operatively connecting the cutter shafts with the power shaft.

70. In a machine of the kind described, the combination of a pair of clearance cutters, means for presenting a blank to said clearance cutters, means for adjusting said cutters with respect to the axis of said blank, and means for separating said cutters at the end of the clearance cut.

71. In a machine of the kind described, the combination of a pilot having cutter tool openings, cutter tools projecting into said openings, means for presenting a blank to said pilot, and means for forcing lubricant axially through said pilot, and out of said openings therein.

72. In a machine of the kind described, the combination of a tubular pilot having cutter tool openings, cutter tools projecting into said openings, means for presenting a blank to said pilot, and means for forcing lubricant axially through said pilot, and out of said openings therein.

73. In a machine of the kind described, the combination of a pilot having cutter tool openings therein, cutter tools projecting into said openings, and means for directing a lubricant under pressure through said pilot for lubricating said tools and washing cuttings out through said pilot openings.

74. In a machine of the kind described, the combination of a pilot having cutter tool openings therein, cutter tools projecting into said openings, means for moving a blank in said pilot longitudinally and angularly, with reference to said tools, and means for directing a lubricant under pressure through said pilot for lubricating said tools and washing cuttings out through said pilot openings.

In testimony whereof I affix my signature, in the presence of two witnesses.

ERNEST J. LEES.

Witnesses:
I. A. SHARP,
EDWARD R. ALEXANDER.